United States Patent [19]

Helmick et al.

[11] 3,992,042

[45] Nov. 16, 1976

[54] RIDING VEHICLE WITH SAFETY APRON

[75] Inventors: Michael H. Helmick; Hans Hauser, both of Fredericktown, Ohio

[73] Assignee: The J. B. Foote Foundry Co., Fredericktown, Ohio

[22] Filed: June 30, 1975

[21] Appl. No.: 591,754

[52] U.S. Cl. ............................... 280/762; 188/4 R
[51] Int. Cl.² ........................................ B60R 27/00
[58] Field of Search ............... 280/150 R, 154.5 R, 280/762; 188/4 R

[56] References Cited
UNITED STATES PATENTS

| | | | |
|---|---|---|---|
| 2,822,890 | 2/1958 | Kriewaldt | 188/4 R |
| 3,310,344 | 3/1967 | Beintum | 280/154.5 R |
| 3,884,498 | 5/1975 | Cote | 280/150 R |

*Primary Examiner*—Robert R. Song
*Attorney, Agent, or Firm*—Allen D. Gutchess, Jr.

[57] ABSTRACT

A riding vehicle, such as a lawn mower, has a flexible apron positioned behind the rear wheels with a lower edge of the apron above the ground. The mower can back up without impediment from the apron, unless an object is encountered. In that case, the object contacting the apron pushes it against the rear wheels and the apron is pulled under the tires where it abruptly snubs the tires and prevents further backing motion. To achieve this, the apron is supported by the mower through yieldable means which holds the apron above the ground until it contacts the wheels. The apron is also anchored to the mower to limit the extent of downward movement of the apron. In a preferred form, the yieldable supporting means for the apron also is resilient so that the apron can be returned to the original position after it is released from the rear wheels, as by driving the mower forwardly again. The apron is capable of stopping the mower securely and abruptly and reliably does so in a fixed, relatively short distance. The apron also has a lower edge which is sufficiently stiff to cause an object encountered to move the apron against the rear wheels but is sufficiently yieldable so that the object, in the case of an animate object, will not be injured if partly caught under the apron when snubbed under the tires.

15 Claims, 8 Drawing Figures

RIDING VEHICLE WITH SAFETY APRON

This invention relates to a vehicle and an apron carried at the rear thereof for preventing accidents when the vehicle is backing up.

Lawn mowers, and particularly rotary lawn mowers, have long been notorious for being highly efficient in causing injuries and damage. In addition to accidents involving the rotating blade, injuries are then caused to animate objects when backing up. Even if the blade is not engaged, injuries can be caused by the heavier or sharper mower components, such as the transmission or transaxle or the mower blade housing, when striking the object during motion. Damage can also result to the mower when striking a solid object.

The present invention provides a back-up or safety apron which is carried by the vehicle and extends substantially across the rear thereof, beyond the rear wheels. The apron is positioned with the lower edge thereof above the ground so that the vehicle can back up unimpededly under normal conditions. However, if an object is encountered, the object pushes the apron against the rear wheels which carry the apron under the tires and abruptly stops the rear motion of the vehicle. For this purpose, an upper portion of the apron is connected to the vehicle body or frame in a manner to limit the movement of the apron downwardly and a portion of the apron is also yieldably supported so that the lower edge is located in the desired position above the ground. When the apron is pushed against the wheels, it is immediately carried under them by the engagement thereof with the tires and abruptly stops the vehicle within a fixed, short distance.

The apron thereby is effective in preventing injury to animate objects such as babies, dogs, and little old ladies taking sunbaths who would otherwise be injured by the rotating blade or blades of the mower or by downwardly-extending components of the mower such as the transmission or transaxle and sharp portions of the blade housing itself. Likewise, injury to the mower is prevented from inanimate objects such as protruding pipes, rocks, curbs, etc.

While the invention has particular utility in combination with riding mowers, it is also effective to prevent or reduce injuries by almost any small vehicle.

It is, therefore, a principal object of the invention to provide a safety apron for a vehicle.

Another object of the invention is to provide an apron for a small vehicle which enables the vehicle to back up without impedence or interference unless an object is encountered.

A further object of the invention is to provide an apron for the rear of a small vehicle which abruptly stops the vehicle in the event an object is encountered when backing.

Many other objects of the invention will be apparent from the following detailed description of preferred embodiments thereof, reference being made to the accompanying drawings, in which.

Figure 1:
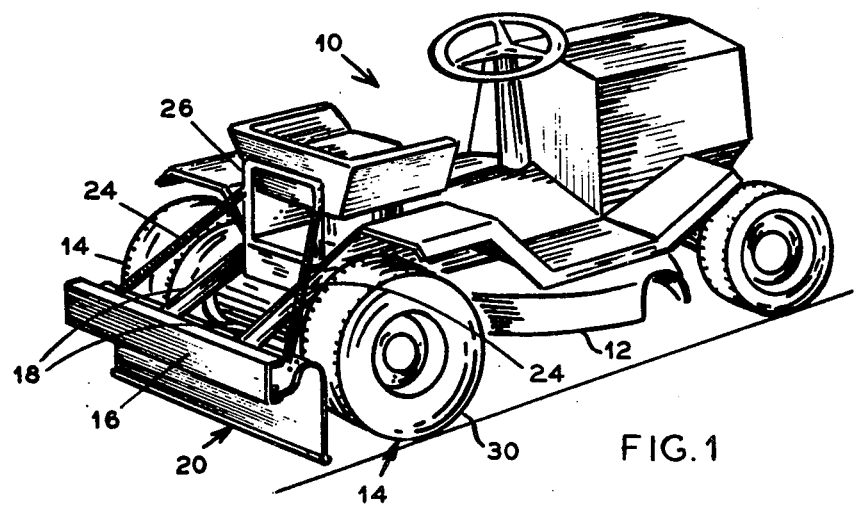
FIG. 1 is a schematic, rear view in perspective of a riding lawn mower having a safety apron in accordance with the invention.
Figure 2:
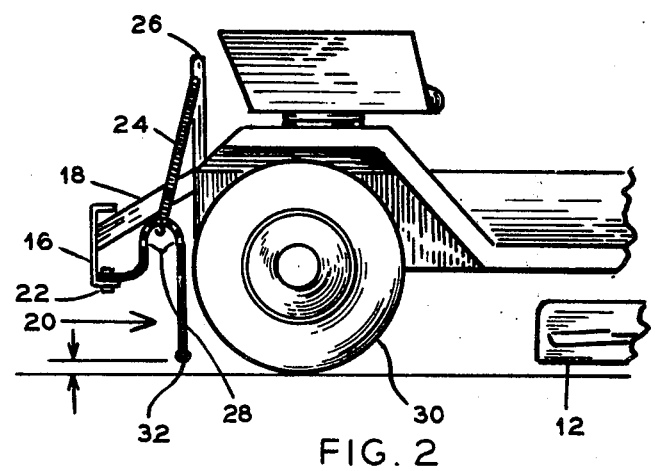
FIG. 2 is a schematic, fragmentary side view in elevation of the mower and apron of FIG. 1, in a normal position.

Referring to the drawings, and particularly to FIG. 1, a small vehicle, specifically in the form of a riding-type lawn mower, is indicated at 10. The mower includes a blade housing 12 and rear wheels 14. In this instance, the mower 10 is also equipped with a rear bumper 16 supported by the mower body through struts 18. It will be readily appreciated that a mower of this general type can cause considerable injury to animate objects if it backs over them, even if the blade or blades within the housing 12 are disengaged. Such injuries can result from the transmission or transaxle located between the rear wheels 14 or from the blade housing 12 which often has relatively sharp edges or corners. Considerable damage to the mower can also result if it backs over solid or heavy inanimate objects.

In accordance with the invention, a back-up or safety apron 20 is located behind the mower 10 and extends substantially across the width thereof, covering the space between the rear wheels 14 as well as being directly behind both of the wheels. The apron 10 can be made of any suitable flexible, sheet-like material, such as plasticized vinyl, rubberized fabric, canvas, etc., with heavier or larger vehicles generally requiring heavier or stronger material for the aprons. An upper edge portion of the apron 20, in this instance, is fastened to the bumper 16 and specifically to the lower, horizontally-extending channel flange thereof to limit downward movement of the apron. This can be accomplished by fasteners 22 which extend through the flange below the edge portion of the apron and through a metal strap located on the opposite side of the edge portion of the apron.

Figure 3:
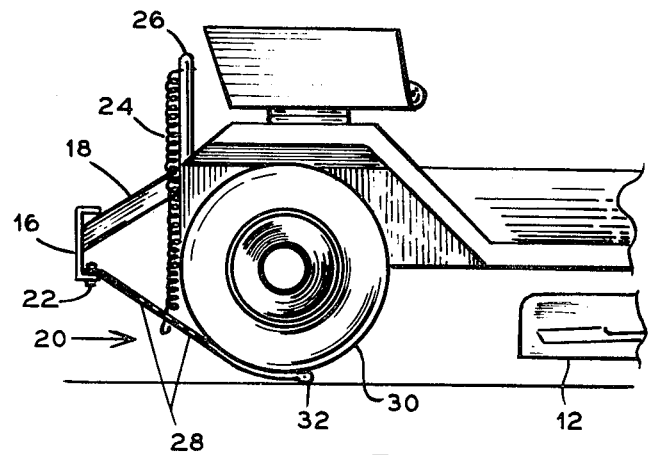
FIG. 3 is a view similar to FIG. 2, but with the mower having backed up and the apron having encountered an object.

In this instance, coil springs 24 have lower ends connected to spaced intermediate portions of the apron 20 and have upper ends connected to the mower and specifically to a support 26 to yieldably support the apron above the ground. The lower ends of the springs 24 can have hook portions which extend through any of several pairs of openings 28 in the intermediate portion of the apron to enable the lower edge portion of the apron 20 to be adjustably positioned to a desired distance above the ground. The lower edge of the apron should be above the grass so that the apron will not drag on the grass as the mower backs up, since the apron would then be pushed against tires 30 of the wheels 14 and be undesirably carried under them to the position of FIG. 3 in which the apron halts further movement of the mower. At the same time, the lower edge of the apron should be low enough so as not to pass over an animate object which could be injured or an inanimate object which could cause damage to the vehicle.

The lower edge portion of the apron 20 has a stiffening rod or member 32 which extends the length of the apron. The rod, which can be of plastic with a three-eighths to one-half inch diameter, by way of example, enables the lower edge portion of the apron 20 to be pushed against the tires 30 if an object intermediate the wheels 14 engages the apron 20. This assures that the apron will be pushed against the tires and carried under them to stop the mower. At the same time, the rod 32 should not be so stiff as to injure a small child or animal which may be caught under the lower edge portion of the apron as the outer lower edge portions move under the tires. From the above, it will be readily seen that the apron 20 substantially reduces the chances of injury to any animate objects about to be backed over by the mower 10. At the same time, damage to the mower is prevented by stopping the backing motion before an inanimate object, such as a pipe or rock, can damage components thereof.

Figure 4:
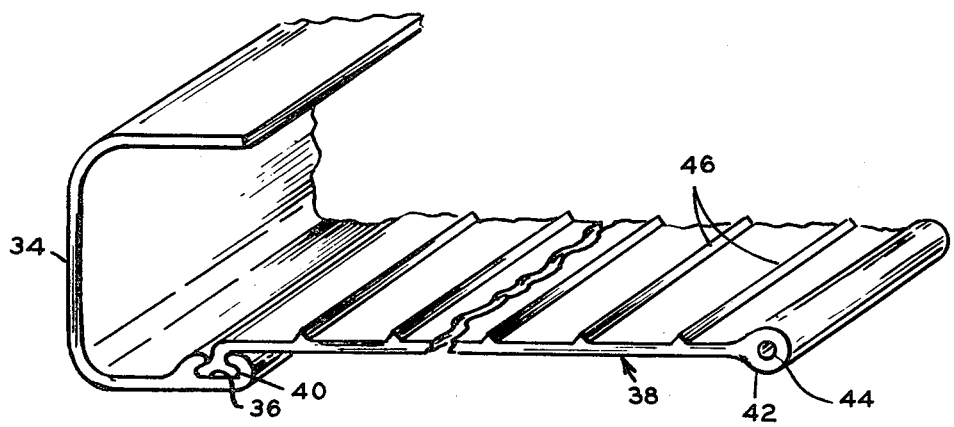
FIG. 4 is a schematic view in perspective of a slightly modified apron and movement-limiting means carried by a vehicle.

Referring to FIG. 4, a slightly modified apron design is shown. In this instance, a modified bumper 34 is of extruded metal and includes a longitudinally-extending, lower channel or groove 36 in a forward edge portion of a lower, horizontal flange thereof. A modified apron 38 can be made of extruded plastic material. The apron has an enlarged bead at the upper end which slides into the channel 36 to be securely anchored therein, extending substantially the length thereof. The apron 38 also has a lower enlarged bead or stiffening member 42 which serves the same function as the rod 32 of the apron 20. If desired, the bead 42 can be formed with a central passage 44, as shown, in which a stiffening rod can be inserted for additional stiffness. In this instance, the apron 38 also has horizontally-extending ridges 46 integrally formed on the forward surface of the apron to provide a better contact between the apron and the tires 30 to assure that the tires will pull the apron 38 under them during the backing motion when an object is engaged.

Figure 5:
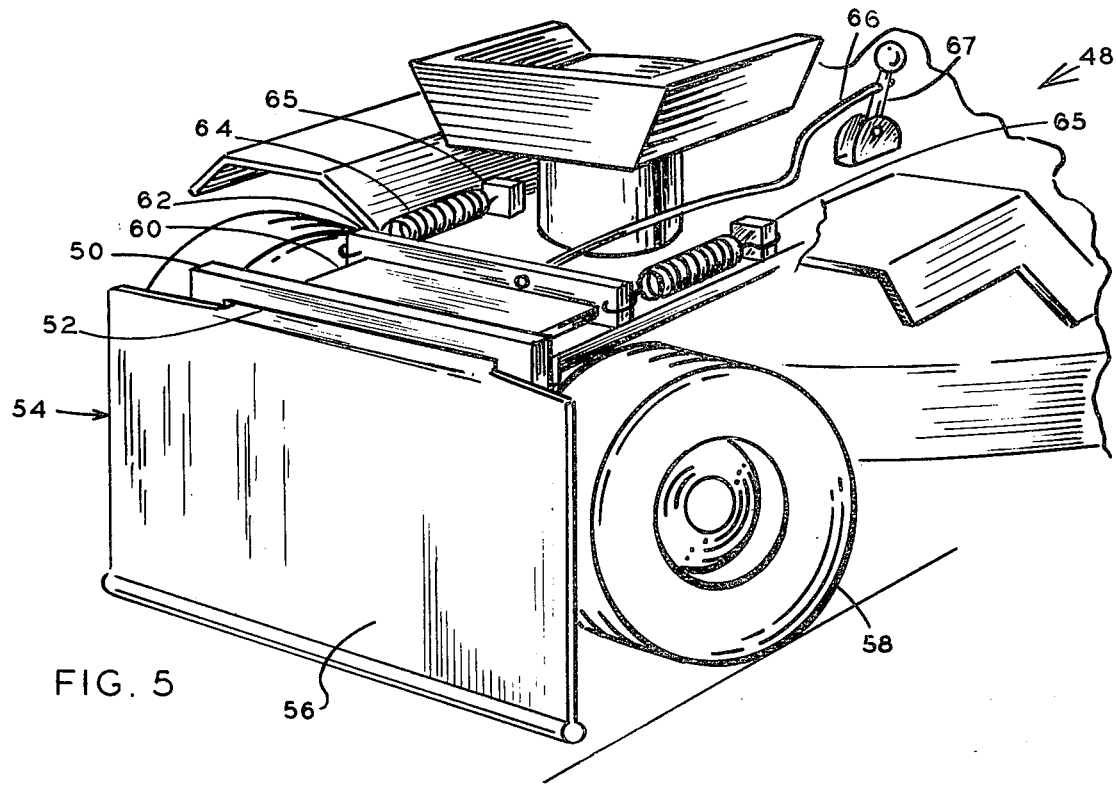
FIG. 5 is a schematic, fragmentary rear view in perspective of a modified mower and safety apron.

A slightly modified mower and apron are schematically shown in FIG. 5. Accordingly, a mower 48 is similar to the mower 20, but without the bumper 16 and the support 26. In this instance, the mower body has a rear stop flange 50 extending upwardly and provided with an elongate slot 52 extending at least a substantial portion of the width of the mower.

A modified apron 54 has a main portion 56 extending the width of the mower including behind tires 58. The apron also has a narrower upper portion 60 which extends through the slot 52 of the stop flange 50 and has an enlargement or bar 62 at the upper edge portion which cannot pass through the slot 52 so as to act as a positive stop to limit the extent that the apron 54 can move downwardly under the tires 58. Coil springs 64 are connected to the bar 62 and also to suitable projections 65 on the mower body to support the apron 54 with a lower edge thereof suitably positioned above the ground. This position can be determined when the upper edge of the wide lower portion 56 of the apron 54 contacts the stop flange 50, or suitable pins can extend from the edges of the upper portion 60 of the apron 54, with these pins being adjustably positioned along the apron to engage the stop flange 50 and adjustably position the lower edge of the apron at a desired distance above the ground, the apron then being yieldably held in that position by the springs 64.

The rotating blade can be disengaged when the apron is pulled downwardly. To achieve this, the bar 62 can have a cable 66 connected to an over-center blade clutch lever 67 or to other clutch mechanism to disengage it when the cable is pulled.

Figure 6:
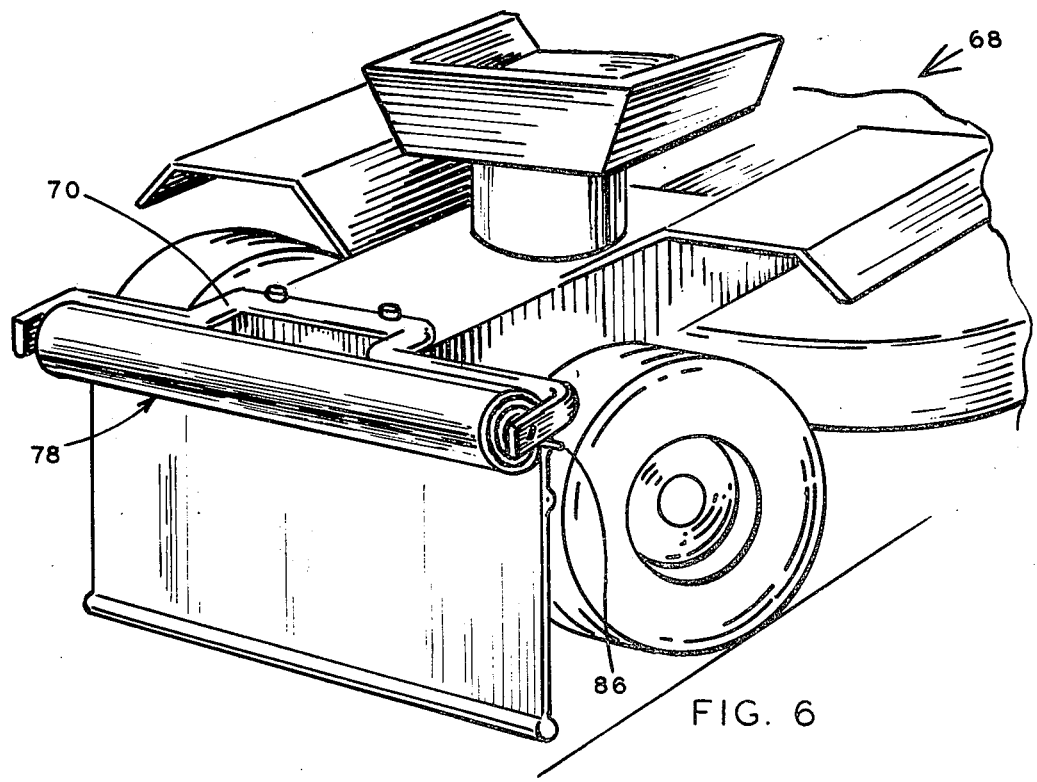
FIG. 6 is a schematic, fragmentary rear view in perspective of a modified mower with another safety apron.
Figure 7:
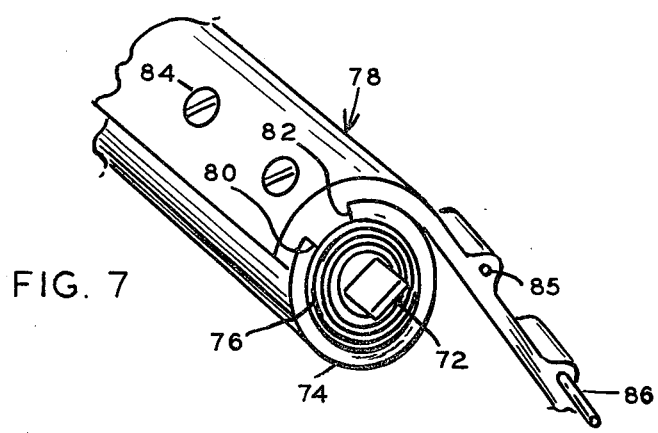
FIG. 7 is an enlarged, fragmentary view in perspective of a portion of the safety apron of FIG. 6.

Another slightly modified mower and apron are schematically shown in FIGS. 6 and 7. In this instance, a mower 68 has a pair of rearwardly-extending outboard struts 70 which receive and support shafts 72 of a roller 74. At least one of the shafts 72 is noncircular and held against rotation by the corresponding struts 70, with a torsion spring 76 connected between the roller 74 and at least one of the shafts 72 to urge the roller 74 in a counterclockwise direction, as viewed in FIGS. 6 and 7. Thus, the roller 74 is similar to that employed with a heavy-duty window shade.

An apron 78 is anchored to the roller 74 and specifically by a rib 80 extending into a groove 82 in the roller and affixed by spaced fasteners 84. This limits the extent of the downward movement of the apron. In this instance, the apron 78 has a plurality of horizontally-extending edge passages 85 which can receive stop pins 86 which extend outwardly therefrom and engage the struts 70 to limit upward movement of the apron 78. Thus, the pins can be placed in any of several pairs of the passages 85 to position the lower edge of the apron 78 a desired distance above the ground, being maintained in that position by the torsion spring 76.

Figure 8:
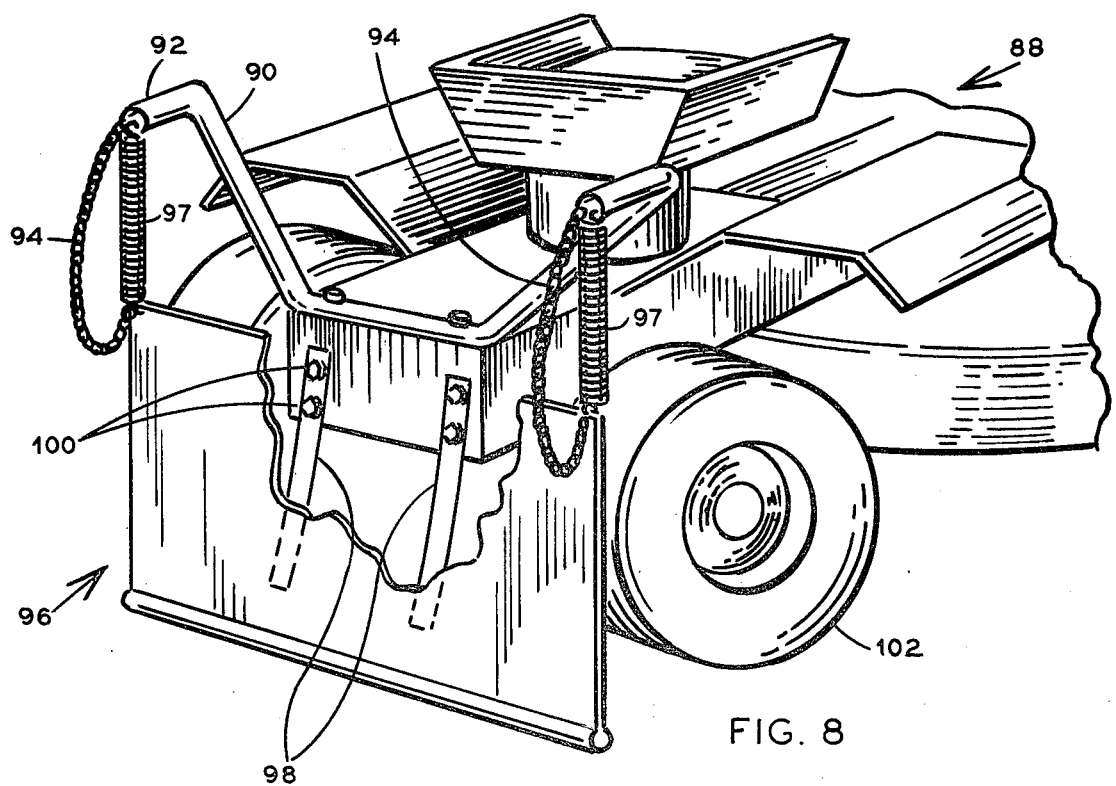
FIG. 8 is a schematic, fragmentary side view in perspective of a further modified mower and safety apron.

FIG. 8 shows another modified mower and apron. A mower 88 has upwardly extending supporting posts 90 having rearwardly-extending bars 92 to which upper ends of chains 94 are connected. The lower ends of the chains 94 are connected to upper edge portions of an apron 96. Even if several of the chains 94 are employed, a stiffening bar is preferably located at the upper edge portion of the apron 96 to spread the anchoring force of the chains 94 as they limit downward movement of the apron. The apron otherwise can be similar to any of those heretofore described. The apron 96 is yieldably supported with a lower edge a desired distance above the ground by at least two coil springs 97.

Also, in accordance with the invention, the mower 88 in this instance is equipped with at least two downwardly-extending resilient leaf springs 98 which are anchored to the mower body by suitable fasteners 100. The springs 98 hold the apron 96 away from tires 102 so that the apron 96 will not engage the tires 102 at an undesirable time and stop the mower during the backing motion. Such might occur, for example, if the mower is backing uphill or is moving over rough ground. However, the springs 98 readily yield to enable the apron 96 to contact the tires 102 if an object is encountered.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. In combination, a vehicle having a frame and a rear wheel rotatably carried under said frame, a flexible apron extending at least a substantial portion of the width of the vehicle, means carried by said vehicle for supporting said apron behind the vehicle and behind said rear wheel, with the lower edge of said apron located above the ground, the heighth of said apron being sufficient to enable said apron to be movable under the rear wheel upon encountering an obstacle, and means for limiting the extent that said apron can move downwardly relative to said vehicle, the downward movement being sufficient to enable said apron to be movable under the rear wheel upon encountering an obstacle.

2. The combination according to claim 1 characterized by yieldable means carried by said vehicle for yieldably maintaining said apron spaced behind said rear wheel.

3. The combination according to claim 1 characterized by said apron supporting means engaging said apron at an intermediate portion between upper and lower edges thereof.

4. The combination according to claim 1 characterized by said apron supporting means engaging the upper edge of said apron.

5. The combination according to claim 1 characterized by said apron supporting means comprising at least two elongate coil springs.

6. The combination according to claim 1 characterized by said apron supporting means comprising at least one torsion spring.

7. The combination according to claim 1 characterized by said movement limiting means comprising a bumper on said vehicle having means for anchoring an upper edge of said apron.

8. The combination according to claim 1 characterized by said movement limiting means comprising an enlargement at an upper portion of said apron, and means forming a narrow aperture carried by said vehicle through which said apron extends, said aperture being smaller than said enlargement to limit the movement of said apron.

9. The combination according to claim 1 characterized by said movement limiting means comprising a roller, an upper edge portion of said apron being affixed to said roller.

10. The combination according to claim 1 characterized by said movement limiting means comprising a chain having one end connected to said apron and the other end connected to said vehicle.

11. A vehicle having a body and two spaced rear wheels to aid in supporting said body above the ground, flexible apron means having a width greater than the lateral spacing of the rear wheels to be movable under the rear wheels upon encountering an obstacle, yieldable means for supporting said apron means behind said body at the rear thereof and with a lower edge portion of said apron means above the ground, and means for limiting the extent to which said apron means can move downwardly.

12. A vehicle according to claim 11 wherein said yieldable supporting means is also resilient and capable of returning said apron to the position with the lower edge above the ground after said apron has been moved to a lower position and then released.

13. A vehicle according to claim 11 wherein said yieldable supporting means can support the apron with the lower edge portion at any of a plurality of distances above the ground.

14. A vehicle according to claim 11 characterized by said apron having a plurality of ridges formed on the side facing the vehicle, with the ridges extending transversely to the plane of rotation of said wheel means.

15. A vehicle according to claim 11 characterized by said vehicle having a rotatable blade and drive means for rotating said blade, and means connected to said apron for disengaging said blade from the drive means when said apron is moved downwardly.

* * * * *